United States Patent
Nemoto et al.

(10) Patent No.: US 11,942,125 B2
(45) Date of Patent: Mar. 26, 2024

(54) THERMAL MEDIUM AND LASER RECORDING DEVICE

(71) Applicants: KABUSHIKI KAISHA TOSHIBA, Tokyo (JP); Toshiba Infrastructure Systems & Solutions Corporation, Kawasaki Kanagawa (JP)

(72) Inventors: Nobuki Nemoto, Kawasaki Kanagawa (JP); Yuuichi Nakamura, Tokyo (JP); Yuuma Kadokura, Kawasaki Kanagawa (JP); Naoto Mihara, Yokohama Kanagawa (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 23 days.

(21) Appl. No.: 17/934,183

(22) Filed: Sep. 21, 2022

(65) Prior Publication Data
US 2023/0019146 A1    Jan. 19, 2023

Related U.S. Application Data

(63) Continuation of application No. PCT/JP2021/012362, filed on Mar. 24, 2021.

(30) Foreign Application Priority Data

Mar. 24, 2020 (JP) .............................. 2020-053200

(51) Int. Cl.
*G11B 7/0033* (2006.01)
*B41M 5/34* (2006.01)
(Continued)

(52) U.S. Cl.
CPC ............ *G11B 7/0033* (2013.01); *G11B 7/127* (2013.01); *G11B 7/24012* (2013.01)

(58) Field of Classification Search
CPC .... G11B 7/0033; G11B 7/24012; B41M 5/34; B41M 2205/04
(Continued)

(56) References Cited

U.S. PATENT DOCUMENTS 11,294,306 B2    4/2022   Nemoto et al.
2016/0318327 A1*  11/2016  Steenackers ......... B41M 5/3275
(Continued)

FOREIGN PATENT DOCUMENTS

JP    H5-131784 A    5/1993
JP    H8-90912 A     4/1996
(Continued)

OTHER PUBLICATIONS

Japan Patent Office, International Search Report in PCT/JP2021/012362 (dated May 18, 2021), 2 pages.

*Primary Examiner* — Toan C Ly
(74) *Attorney, Agent, or Firm* — Finnegan, Henderson, Farabow, Garrett & Dunner, LLP

(57) ABSTRACT

A thermal medium and a laser recording device are provided in which medium parameters can be acquired efficiently. According to one embodiment, the thermal medium includes a photothermal conversion layer, a color development layer, a storage mechanism. The photothermal conversion layer converts an applied laser beam into heat. The color development layer develops a color by the heat converted by the photothermal conversion layer. The storage mechanism stores information related to a medium parameter including a photothermal conversion efficiency of the photothermal conversion layer.

13 Claims, 6 Drawing Sheets

(51) Int. Cl.
*G11B 7/127* (2012.01)
*G11B 7/24012* (2013.01)

(58) Field of Classification Search
USPC .................................................. 235/19, 488
See application file for complete search history.

(56) References Cited

U.S. PATENT DOCUMENTS

| | | |
|---|---|---|
| 2017/0066251 A1 | 3/2017 | Nemoto et al. |
| 2017/0190200 A1* | 7/2017 | Usami ..................... B41M 5/34 |
| 2019/0389235 A1 | 12/2019 | Kadokura et al. |
| 2020/0094603 A1 | 3/2020 | Nemoto et al. |

FOREIGN PATENT DOCUMENTS

| | | |
|---|---|---|
| JP | 2002-321397 A | 11/2002 |
| JP | 2004-249552 A | 9/2004 |
| JP | 2005-138558 A | 6/2005 |
| JP | 2009-23209 A | 2/2009 |
| JP | 4386779 B2 | 12/2009 |
| JP | 2013-208845 A | 10/2013 |
| JP | 2017-52261 A | 3/2017 |
| JP | 2018-47578 A | 3/2018 |
| JP | 2018-160048 A | 10/2018 |
| JP | 3218527 U | 10/2018 |
| JP | 2019-55515 A | 4/2019 |
| JP | 2019-192319 A | 10/2019 |
| JP | 2019-220240 A | 12/2019 |
| JP | 2020-61200 A | 4/2020 |
| JP | 2021-79562 A | 5/2021 |

* cited by examiner

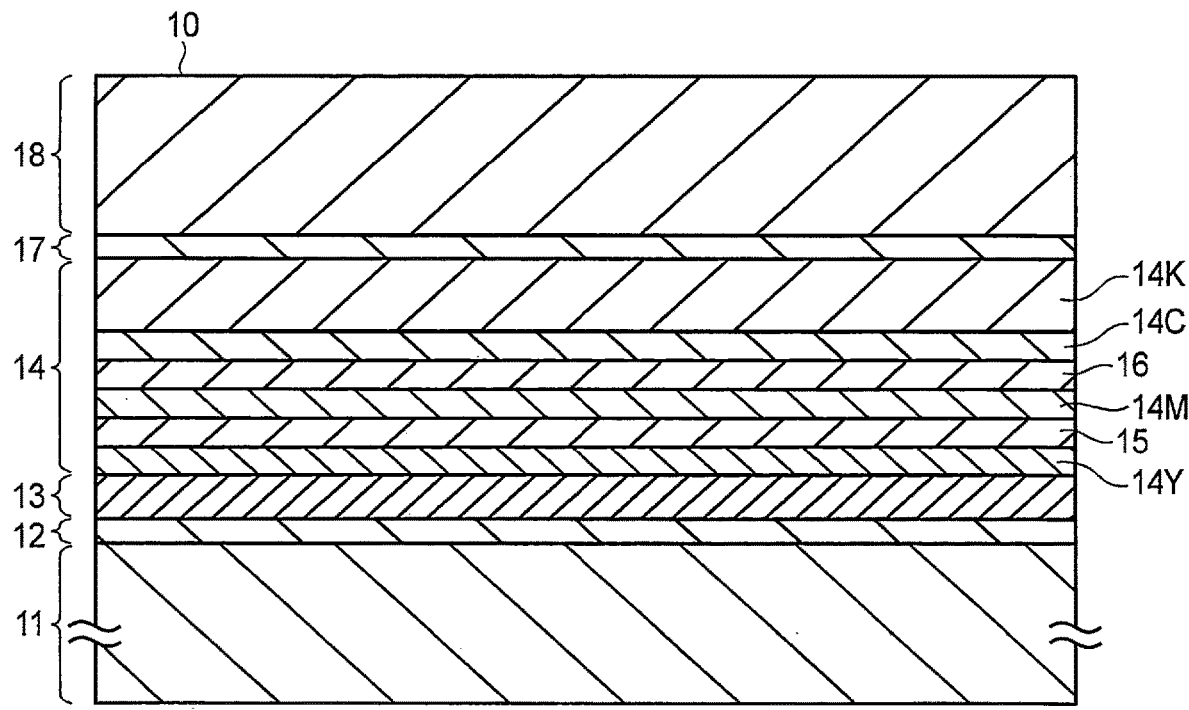

FIG. 3

| Reference number | Name | Thickness [μm] | Thermal conductivity ratio [W/m/K] |
|---|---|---|---|
| 11 | Base material | 100 | 0.01~5.00 |
| 12 | Adhesive layer | 0.5~100 | 0.01~50 |
| 13 | Photothermal conversion layer | 0.5~30 | 0.01~1 |
| 14Y | High-temperature thermal Y color development layer | 1~10 | 0.1~10 |
| 14M | Medium-temperature thermal M color development layer | 1~10 | 0.1~10 |
| 14C | Low-temperature thermal C color development layer | 1~10 | 0.1~10 |
| 14K | Light-absorption color development layer | 1~200 | 0.01~50 |
| 15 | Intermediate layer | 7~100 | 0.01~50 |
| 16 | Intermediate layer | 7~100 | 0.01~50 |
| 17 | Adhesive layer | 0.5~100 | 0.01~50 |
| 18 | Protective/functional layer | 0.5~10 | 0.01~1 |

FIG. 4

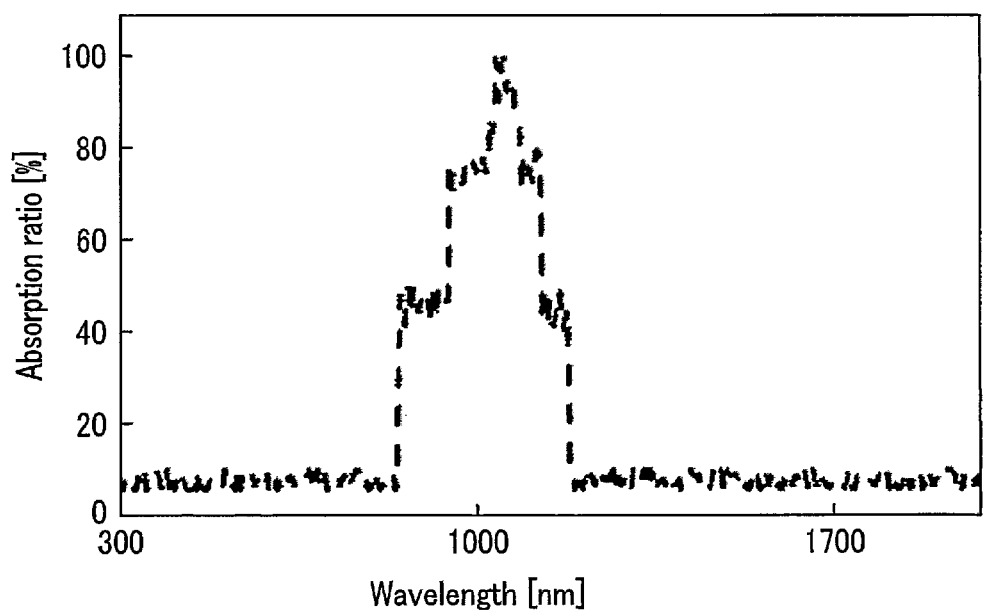
F I G. 5

THERMAL MEDIUM AND LASER RECORDING DEVICE

CROSS REFERENCE TO RELATED APPLICATIONS

This application is a Continuation Application of PCT Application No. PCT/JP2021/012362, filed Mar. 24, 2021 and based upon and claiming the benefit of priority from Japanese Patent Application No. 2020-053200, filed Mar. 24, 2020, the entire contents of all of which are incorporated herein by reference.

FIELD

Embodiments described herein relate generally to a thermal medium and a laser recording device.

BACKGROUND

A technique has been provided in which an image is formed on a thermal medium having a color development layer that develops a color through heat. In such a technique, a photothermal conversion layer formed in a vicinity of the color development layer is irradiated with a laser beam to heat the color development layer. A device (laser recording device) for forming an image on a thermal medium sets irradiation parameters such as a wavelength or an intensity of a laser beam to be applied based on medium parameters such as a photothermal conversion efficiency of the photothermal conversion layer.

Conventionally, a laser recording device requires an input of medium parameters for each thermal medium through an operation by a user or the like.

CITATION LIST

Patent Literature

Patent Document 1 Jpn. Pat. Appln. KOKAI Publication No. 2005-138558

SUMMARY

Technical Problem

To solve the problem described above, a thermal medium and a laser recording device are provided in which medium parameters can be acquired efficiently.

Solution to Problem

According to one embodiment, a thermal medium includes a photothermal conversion layer, a color development layer, a storage mechanism. The photothermal conversion layer converts an applied laser beam into heat. The color development layer develops a color by the heat converted by the photothermal conversion layer. The storage mechanism stores information related to a medium parameter including a photothermal conversion efficiency of the photothermal conversion layer.

BRIEF DESCRIPTION OF THE DRAWINGS

FIG. 3 is a cross-sectional view of a configuration example of the thermal medium according to the embodiment.

FIG. 4 is a diagram for explaining a thickness and a thermal conductivity ratio of the thermal medium according to the embodiment.

FIG. 5 is a diagram showing an example of light absorption characteristics of a photothermal conversion layer according to the embodiment.

DETAILED DESCRIPTION

Hereinafter, embodiments will be described with reference to the drawings.

A recording system according to the embodiment prints an image on a thermal medium. The recording system irradiates the thermal medium with a laser beam to thereby heat the thermal medium. The recording system controls a position, intensity, etc. of the laser beam to be applied to print an image on the thermal medium.

Figure 1:
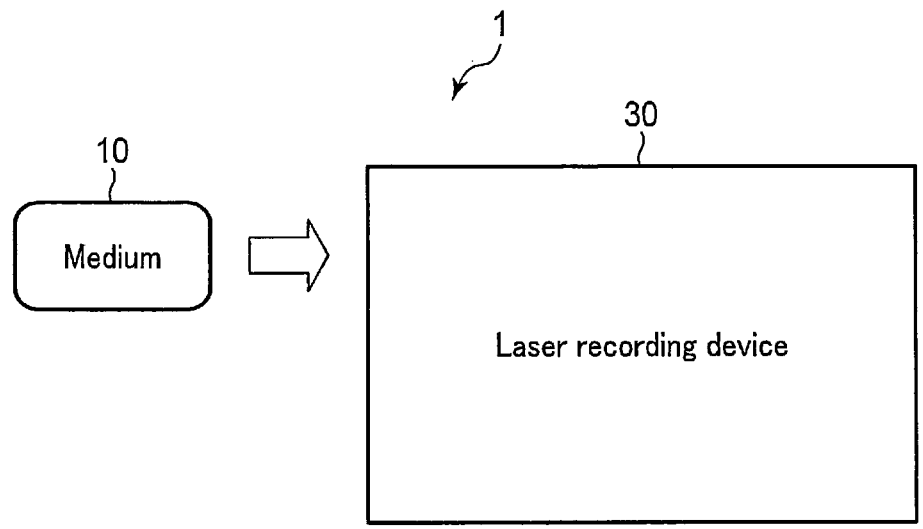
FIG. 1 is a block diagram illustrating a configuration example of a recording system according to an embodiment.

FIG. 1 illustrates a configuration example of a recording system 1 according to the embodiment. As shown in FIG. 1, the recording system 1 includes a thermal medium 10, a laser recording device 30, etc.

The thermal medium 10 is a medium on which an image is printed through a laser beam. Here, the thermal medium 10 is formed into a card shape. For example, the thermal medium 10 is used as identification. For example, the thermal medium 10 is used as identification such as a driver's license, an individual number card, or an insurance card. The thermal medium 10 may be used as a credit card or a cash card. The application of the thermal medium 10 is not limited to a specific configuration. The thermal medium 10 will be described in detail later.

The laser recording device 30 irradiates the thermal medium 10 with a laser beam to print an image. The thermal medium 10 is inserted into the laser recording device 30 from the outside. The laser recording device 30 applies a laser beam to print a predetermined image on the inserted thermal medium 10. The laser recording device 30 discharges, to the outside, the thermal medium 10 on which the predetermined image is printed. The laser recording device 30 will be described in detail later.

Next, the thermal medium 10 will be described.

Figure 2:
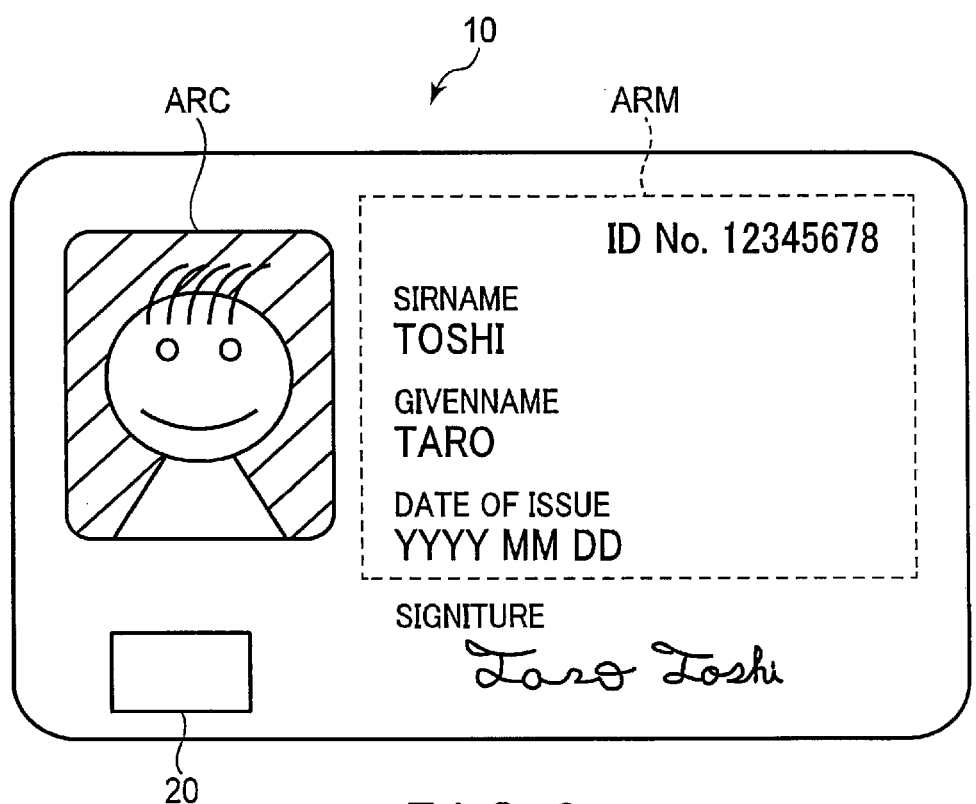
FIG. 2 is a front view of a configuration example of a thermal medium according to the embodiment.

FIG. 2 shows a surface of the thermal medium 10 on which the image is formed by the laser recording device 30.

As shown in FIG. 2, the thermal medium 10 includes a full-color image forming area ARC in which a full-color image such as an identification photograph is recorded, and a monochrome image forming area ARM in which specific information such as ID information, a name, and an issue date is recorded in monochrome.

The thermal medium 10 further includes a storage mechanism 20. The storage mechanism 20 will be described in detail later.

FIG. 3 is a cross-sectional view of a configuration example of the thermal medium 10. FIG. 4 is an explanatory diagram of a thickness and a thermal conductivity ratio of the thermal medium 10.

The thermal medium 10 is a medium in which at least one color development layer that develops a color by heat and a protective layer that protects color development of the at least one color development layer are laminated. The color development layer has light transmission properties before color development.

As a specific example, the thermal medium 10 has a structure in which, as shown in FIG. 3, an adhesive layer 12, a photothermal conversion layer 13, a high-temperature thermal Y color development layer 14Y, an intermediate layer 15, a medium-temperature thermal M color development layer 14M, an intermediate layer 16, a low-temperature thermal C color development layer 14C, a light-absorption color development layer 14K, an adhesive layer 17, and a protective functional layer 18 are laminated in order on a base material 11. The light-absorption color development layer 14K is provided as a black color development layer. The high-temperature thermal Y color development layer 14Y, the medium-temperature thermal M color development layer 14M, the low-temperature thermal C color development layer 14C, and the light-absorption color development layer 14K constitute a color development layer group 14. The protective functional layer 18 forms a front surface (surface on which an image is formed). The base material 11 forms a back surface.

The thermal medium 10 may include a configuration as needed in addition to the configuration shown in FIG. 3, or a specific configuration may be excluded from the thermal medium 10.

The high-temperature thermal Y color development layer 14Y, the medium-temperature thermal M color development layer 14M, and the low-temperature thermal C color development layer 14C function as color development layers that develop yellow, magenta, and cyan, respectively.

The intermediate layers 15 and 16 each function as a heat insulating layer that adjusts the amount of heat transfer and reduces heat transfer.

The base material 11 holds the adhesive layer 12, the photothermal conversion layer 13, the high-temperature thermal Y color development layer 14Y, the intermediate layer 15, the medium-temperature thermal M color development layer 14M, the intermediate layer 16, the low-temperature thermal C color development layer 14C, the light-absorption color development layer 14K, the adhesive layer 17, and the protective functional layer 18.

The thickness of the base material 11 is set to 100 μm, and the thermal conductivity ratio thereof is set to 0.01 to 5.00 W/m/K, for example.

The photothermal conversion layer 13 absorbs recording light (recording laser light) of a given wavelength to perform photothermal conversion. The photothermal conversion layer 13 generates heat for causing at least any one of the high-temperature thermal Y color development layer 14Y, the medium-temperature thermal M color development layer 14M, or the low-temperature thermal C color development layer 14C to develop a color.

The thickness of the photothermal conversion layer 13 is set to 0.5 to 30 μm, and the thermal conductivity ratio thereof is set to 0.01 to 50 W/m/K, for example.

The adhesive layer 12 is a layer that holds the base material 11 and the photothermal conversion layer 13 while bonding them.

The thickness of the adhesive layer 12 is set to 0.5 to 100 μm, and the thermal conductivity ratio thereof is set to 0.01 to 50 W/m/K, for example.

The high-temperature thermal Y color development layer 14Y (first color development layer) is a layer containing a temperature-indicating material as a thermal material that develops yellow (first color) if its own temperature becomes equal to or higher than a first threshold temperature T1.

The thickness of the high-temperature thermal Y color development layer 14Y is set to 1 to 10 μm, and the thermal conductivity ratio thereof is set to 0.01 to 10 W/m/K, for example.

The medium-temperature thermal M color development layer 14M (second color development layer) is a layer containing a temperature-indicating material as a thermal material that develops magenta (second color) if its own temperature becomes equal to or higher than a second threshold temperature T2 (<T1).

The thickness of the medium-temperature thermal M color development layer 14M is set to 1 to 10 μm, and the thermal conductivity ratio thereof is set to 0.1 to 10 W/m/K, for example.

The low-temperature thermal C color development layer 14C (third color development layer) is a layer containing a temperature-indicating material as a thermal material that develops cyan (third color) if its own temperature becomes equal to or higher than a third threshold temperature T3 (<T2<T1).

The thickness of the low-temperature thermal C color development layer 14C is set to 1 to 10 μm, and the thermal conductivity ratio thereof is set to 0.1 to 10 W/m/K, for example.

The intermediate layer 15 is a layer that provides a thermal barrier at the time of color development of the high-temperature thermal Y color development layer 14Y and reduces heat transfer from the low-temperature thermal C color development layer 14C side to the medium-temperature thermal M color development layer 14M and the low-temperature thermal C color development layer 14C.

The thickness of the intermediate layer 15 is set to 7 to 100 μm, and the thermal conductivity ratio thereof is set to 0.01 to 50 W/m/K, for example.

The intermediate layer 16 is a layer that provides a thermal barrier at the time of color development of the medium-temperature thermal M color development layer 14M and reduces heat transfer from the medium-temperature thermal M color development layer 14M side to the low-temperature thermal C color development layer 14C.

The thickness of the intermediate layer 16 is set to 7 to 100 μm, and the thermal conductivity ratio thereof is set to 0.01 to 50 W/m/K, for example.

The light-absorption color development layer 14K is a layer including pigment particles and developing a color irreversibly by the pigment particles absorbing and carbonizing recording light.

The thickness of the light-absorption color development layer 14K is set to 1 to 200 μm, and the thermal conductivity ratio thereof is set to 0.01 to 50 W/m/K, for example.

The adhesive layer 17 is a layer that holds the light-absorption color development layer 14K and the protective functional layer 18 while bonding them.

The thickness of the adhesive layer 17 is set to 0.5 to 100 μm, and the thermal conductivity ratio thereof is set to 0.01 to 50 W/m/K, for example.

The protective functional layer 18 protects the adhesive layer 17, the light-absorption color development layer 14K, the low-temperature thermal C color development layer 14C, the intermediate layer 16, the medium-temperature thermal M color development layer 14M, the intermediate layer 15, the high-temperature thermal Y color development layer 14Y, the photothermal conversion layer 13, and the adhesive layer 12. The protective functional layer 18 is a layer used for arrangement of anti-counterfeit items such as a hologram, a lenticular lens, a microarray lens, or an ultraviolet excitation type fluorescent ink, insertion of an internal protection item such as an ultraviolet cut layer, or both of these functions.

The protective functional layer 18 is preferably colorless and transparent since there is a need to visually check the color development of the color development layer group 14 formed under the protective functional layer 18.

The thickness of the protective functional layer 18 is set to 0.5 to 10 μm, and the thermal conductivity ratio thereof is set to 0.01 to 1 W/m/K, for example.

Next, light absorption characteristics of the photothermal conversion layer 13 will be described.

FIG. 5 is an explanatory diagram of an example of the light absorption characteristics of the photothermal conversion layer 13.

In FIG. 5, the horizontal axis represents the wavelength of light. The vertical axis represents the absorption ratio of light (photothermal conversion efficiency). As shown in FIG. 5, the photothermal conversion layer 13 has absorption characteristics having a peak at a wavelength λ (for example, λ=1064 nm) belonging to near infrared rays.

Meanwhile, the base material 11, the adhesive layer 12, the high-temperature thermal Y color development layer 14Y, the intermediate layer 15, the medium-temperature thermal M color development layer 14M, the intermediate layer 16, the low-temperature thermal C color development layer 14C, the adhesive layer 17, and the protective functional layer 18 are each formed of a material that transmits light having a wavelength λ belonging to near infrared rays (near infrared light). This is because light having a wavelength A that can be absorbed by the light-absorption color development layer 14K or the photothermal conversion layer 13 (near infrared light) is made to reach these layers. At least a part of the base material 11 may be formed of a material that transmits near infrared light.

Thus, if near infrared light having a wavelength λ (for example, λ=1064 nm) is incident from the base material 11 side, the incident near infrared light is transmitted through the respective layers in order from the base material 11 to the adhesive layer 12, and is mostly absorbed by the photothermal conversion layer 13. The incident near infrared light is photo-thermally converted by the photothermal conversion layer 13 to heat the high-temperature thermal Y color development layer 14Y, the medium-temperature thermal M color development layer 14M, or the low-temperature thermal C color development layer 14C to develop a color.

On the other hand, if recording light is incident from the protective functional layer 18 side, the incident recording light is transmitted through the respective layers in order from the protective functional layer 18 to the adhesive layer 17, and is mostly absorbed by the light-absorption color development layer 14K. The incident recording light heats the light-absorption color development layer 14K to develop a color.

In the example of the thermal medium 10, the high-temperature thermal Y color development layer 14Y and the photothermal conversion layer 13 are laminated as independent layers. As another example, by mixing a photothermal conversion material into the high-temperature thermal Y color development layer 14Y, the high-temperature thermal Y color development layer 14Y may serve as the photothermal conversion layer.

The photothermal conversion layer 13 and the light-absorption color development layer 14K may have different light absorption characteristics. For example, the photothermal conversion layer 13 may have absorption characteristics having a peak at a predetermined wavelength λ (for example, λ=800 nm). The light-absorption color development layer 14K may have absorption characteristics having a peak at a different wavelength λ (for example, λ=1064 nm).

In this case, the laser irradiation mechanism 37 may irradiate the photothermal conversion layer 13 and the light-absorption color development layer 14K with recording laser light having different wavelengths from the protective functional layer 18 side. The light-absorption color development layer 14K is made of a material that transmits recording laser light (light having the same wavelength as that of the recording laser light) to the photothermal conversion layer 13. The base material 11 may not have transmission properties.

The laser irradiation mechanism 37 may irradiate the photothermal conversion layer 13 and the light-absorption color development layer 14K with recording laser light having different wavelengths from the base material 11 side. The photothermal conversion layer 13 is made of a material that transmits recording laser light (light having the same wavelength as that of the recording laser light) to the light-absorption color development layer 14K. The protective functional layer 18 may not have transmission properties.

Next, the storage mechanism 20 will be described.

The storage mechanism 20 stores information related to parameters (medium parameters) of the thermal medium 10. Here, the storage mechanism 20 stores medium parameters.

A medium parameter is used for the laser recording device 30 to apply the recording laser light. That is, the medium parameter is used for the laser recording device 30 to determine a wavelength or intensity, etc. of the recording laser light.

The medium parameter includes a photothermal conversion efficiency of the photothermal conversion layer 13 at a predetermined wavelength. The medium parameter may indicate a photothermal conversion efficiency of the photothermal conversion layer 13 at a plurality of wavelengths. The medium parameter may include a parameter with which the laser recording device 30 can calculate the photothermal conversion efficiency of the photothermal conversion layer 13.

The medium parameter may include an intensity of the recording laser light. For example, the medium parameter may include a pulse width, period, or duty ratio, etc. output by the laser recording device 30 for applying the recording laser light.

The medium parameter may include a distance from the front or back surface of the thermal medium 10 to the photothermal conversion layer 13 or the light-absorption color development layer 14K.

The configuration of the medium parameter is not limited to a specific configuration.

The storage mechanism 20 stores the medium parameter in a state of being readable by the laser recording device 30.

For example, the storage mechanism 20 is a code obtained by encoding the medium parameter according to a predetermined algorithm. In this case, the storage mechanism 20 is printed on the front or back surface of the thermal medium 10. For example, the storage mechanism 20 is a bar code or a two-dimensional code (for example, a QR code (registered trademark)).

The storage mechanism 20 may be a character string, a numerical value, a symbol, or a combination thereof indicating the medium parameter. In this case, the storage mechanism 20 is printed on the front or back surface of the thermal medium 10.

The storage mechanism 20 may be an IC chip that stores the medium parameter. In this case, the storage mechanism 20 includes a communication unit for communicating with the laser recording device 30 in a wireless or wired manner, a control unit for transmitting the medium parameter to the laser recording device 30 through the communication unit, etc. The storage mechanism 20 may be formed inside the protective functional layer 18, etc. The storage mechanism 20 may be formed in the protective functional layer 18, etc. so that the communication unit is exposed to the outside.

The storage mechanism 20 may also be a magnetic stripe encoded with the medium parameter.

Note that the configuration of the storage mechanism 20 is not limited to a specific configuration.

Next, the laser recording device 30 will be described.

Figure 6:
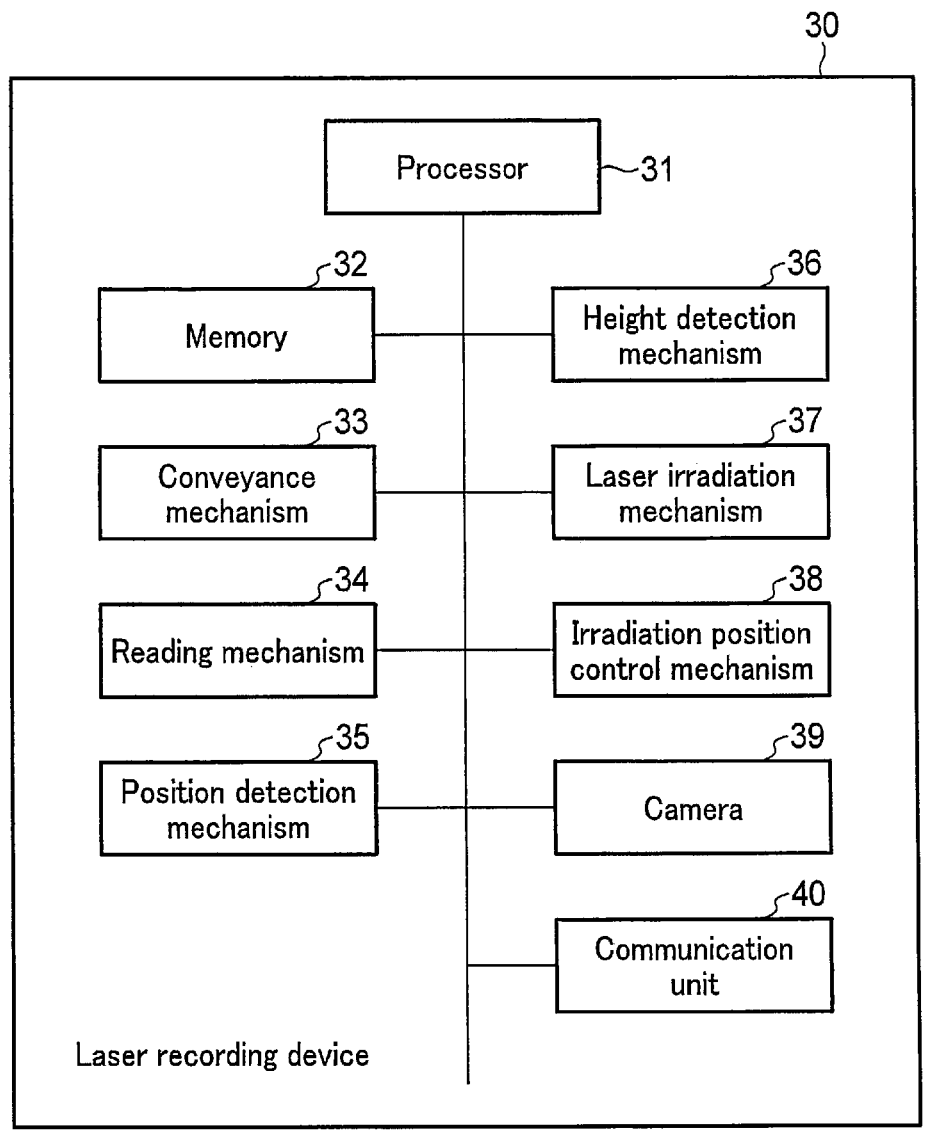
FIG. 6 is a block diagram showing a configuration example of a laser recording device according to the embodiment.

FIG. 6 shows a configuration example of the laser recording device 30. As shown in FIG. 6, the laser recording device 30 includes a processor 31, a memory 32, a conveyance mechanism 33, a reading mechanism 34, a position detection mechanism 35, a height detection mechanism 36, a laser irradiation mechanism 37, an irradiation position control mechanism 38, a camera 39, a communication unit 40, etc. The processor 31, the memory 32, the conveyance mechanism 33, the reading mechanism 34, the position detection mechanism 35, the height detection mechanism 36, the laser irradiation mechanism 37, the irradiation position control mechanism 38, the camera 39, and the communication unit 40 are connected to each other via a data bus or an interface, etc.

The laser recording device 30 may include a configuration as needed in addition to the configuration shown in FIG. 6, or a specific configuration may be excluded from the laser recording device 30.

The processor 31 controls the entire operation of the laser recording device 30. For example, the processor 31 controls the laser irradiation mechanism 37, etc. to irradiate the thermal medium 10 with the recording laser light.

For example, the processor 31 includes a CPU, etc. The processor 31 may include an application specific integrated circuit (ASIC), etc. The processor 31 may include a field programmable gate array (FPGA), etc.

The memory 32 stores various types of data. For example, the memory 32 functions as a ROM, RAM, and NVM.

For example, the memory 32 stores a control program, control data, etc. The control program and the control data are incorporated in advance according to the specifications of the laser recording device 30. For example, the control program is a program, etc. supporting functions realized by the laser recording device 30.

The memory 32 temporarily stores data, etc. being processed by the processor 31. The memory 32 may store data necessary for executing the application program, an execution result of the application program, etc.

The conveyance mechanism 33 feeds the thermal medium 10 under the control of the processor 31. The conveyance mechanism 33 receives an insertion of the thermal medium 10 from the outside. The conveyance mechanism 33 conveys the inserted thermal medium 10 to each unit of the laser recording device 30. The conveyance mechanism 33 discharges the thermal medium 10 to the outside.

For example, the conveyance mechanism 33 includes a guide rail, a conveyance roller, etc.

The reading mechanism 34 reads the medium parameter from the storage mechanism 20 of the thermal medium 10. The reading mechanism 34 transmits the read medium parameter to the processor 31. The reading mechanism 34 has a configuration corresponding to the configuration of the storage mechanism 20.

For example, if the storage mechanism 20 is a code, the reading mechanism 34 includes a camera that captures an image of the storage mechanism 20, a processor that decodes the captured code to acquire a medium parameter, etc.

If the storage mechanism 20 is a character string, etc., the reading mechanism 34 includes a camera that captures an image of the storage mechanism 20, a processor that recognizes characters such as the captured character string to acquire a medium parameter, etc.

If the storage mechanism 20 is an IC chip, the reading mechanism 34 includes a reader that transmits and receives data to and from the IC chip, etc.

If the storage mechanism 20 is a magnetic stripe, the reading mechanism 34 includes a magnetic head that reads the magnetic stripe, etc.

Note that the reading mechanism 34 may include a mechanism corresponding to each configuration of the storage mechanism 20. The configuration of the reading mechanism 34 is not limited to a specific configuration.

The position detection mechanism 35 detects a position of the thermal medium 10 when the laser irradiation mechanism 37 applies the recording laser light. The position detection mechanism 35 transmits the detected position to the processor 31. For example, the position detection mechanism 35 detects the position of the end portion of the thermal medium 10. For example, the position detection mechanism 35 includes a detection plate that detects contact with the end portion, a camera that captures an image of the thermal medium 10 or a laser scanner, etc. The configuration of the position detection mechanism 35 is not limited to a specific configuration.

The height detection mechanism 36 detects a height of the thermal medium 10 (a distance in the thickness direction of the thermal medium 10) when the laser irradiation mechanism 37 applies the recording laser light. The height detection mechanism 36 transmits the detected height to the processor 31.

For example, the height detection mechanism 36 acquires heights at three points of the thermal medium 10 using a laser beam, etc. The height detection mechanism 36 specifies a plane including a surface of the thermal medium 10 from the acquired heights at the three points. The height detection mechanism 36 acquires a height at each point of the thermal medium 10 based on the specified plane.

The laser irradiation mechanism 37 irradiates the thermal medium 10 with recording laser light under the control of the processor 31. The laser irradiation mechanism 37 sets a wavelength of the recording laser light under the control of the processor 31. The laser irradiation mechanism 37 sets an intensity and irradiation timing of the recording laser light under the control of the processor 31.

For example, the laser irradiation mechanism 37 includes an irradiation unit (for example, a laser diode) that outputs recording laser light, a lens that diffuses or converges the recording laser light output by the irradiation unit, etc.

The irradiation position control mechanism 38 controls a position of the thermal medium 10 to be irradiated with the recording laser light under the control of the processor 31.

For example, the irradiation position control mechanism 38 controls a traveling direction of the recording laser light radiated by the laser irradiation mechanism 37. For example, the irradiation position control mechanism 38 includes a galvanometer mirror or a polygon mirror, etc.

The irradiation position control mechanism 38 may control the position of the thermal medium 10. For example, the irradiation position control mechanism 38 includes a stage that movably supports the thermal medium 10, etc.

The irradiation position control mechanism 38 may control both the traveling direction of the recording laser light and the position of the thermal medium 10.

The camera 39 captures an image of the thermal medium 10 under the control of the processor 31. The camera 39 transmits the captured image to the processor 31. The camera 39 is installed so as to capture an image of the thermal medium 10 from the upper side to the lower side.

The communication unit 40 is an interface for transmitting and receiving data to and from an external device. For example, the communication unit 40 supports a local area network (LAN) connection. For example, the communication unit 40 may support universal serial bus (USB) connection.

Next, functions realized by the laser recording device 30 will be described. The functions realized by the processor 31 are realized by the processor 31 executing a program stored in the internal memory or the memory 32, etc.

First, the processor 31 has a function of acquiring data (recording data) for generating an image (print image) to be printed on the thermal medium 10.

For example, the recording data may include image information such as a face photograph, and specific information such as ID information, a name, and an issue date. For example, the recording data is data related to identification such as a driver's license, an individual number card, or an insurance card. The recording data is data related to a credit card or a cash card, etc.

For example, the processor 31 acquires the recording data from the external device via the communication unit 40. The processor 31 may acquire the recording data based on an operator's operation. The method by which the processor 31 acquires the recording data is not limited to a specific method.

Next, the processor 31 has a function of acquiring, by using the reading mechanism 34, the medium parameter from the storage mechanism 20 of the thermal medium 10.

The processor 31 feeds, by using the conveyance mechanism 33, the thermal medium 10. The processor 31 conveys, by using the conveyance mechanism 33, the thermal medium 10 to a position where the reading mechanism 34 can read the storage mechanism 20. Upon conveying the thermal medium 10 to this position, the processor 31 acquires, by using the reading mechanism 34, the medium parameter from the storage mechanism 20 of the thermal medium 10.

The processor 31 has a function of determining whether an image can be printed on the thermal medium 10 based on the acquired medium parameter.

For example, the processor 31 specifies a wavelength of recording laser light for printing an image on the thermal medium 10 based on the medium parameter. For example, the processor 31 specifies, as a wavelength of the recording laser light, a wavelength at which the photothermal conversion efficiency exceeds a predetermined threshold value.

The processor 31 determines whether the laser irradiation mechanism 37 can apply light having the specified wavelength. Upon determining that the laser irradiation mechanism 37 can apply light having the specified wavelength, the processor 31 determines that an image can be printed on the thermal medium 10. Upon determining that the laser irradiation mechanism 37 cannot apply light having the specified wavelength, the processor 31 determines that an image cannot be printed on the thermal medium 10.

Upon determining that an image cannot be printed on the thermal medium 10, the processor 31 outputs an error. In this case, the processor 31 may discharge the thermal medium 10 to the outside using the conveyance mechanism 33.

As for the method of determining by the processor 31 whether an image can be printed on the thermal medium 10 based on the acquired medium parameter, the method is not limited to a specific method.

The processor 31 has a function of setting a calibration area in the thermal medium 10.

The calibration area is an area in which a color chart is printed to perform color calibration.

The processor 31 applies the recording data to a predetermined format to generate a print image.

The processor 31 conveys, using the conveyance mechanism 33, the thermal medium 10 to a position where the laser irradiation mechanism 37 can apply the recording laser light. Upon conveying the thermal medium 10 to the position, the processor 31 specifies the position of the thermal medium 10 using the position detection mechanism 35.

The processor 31 specifies a position (recording position) to be irradiated with the recording laser light based on the generated print image and the position of the thermal medium 10.

Upon specifying the recording position, the processor 31 specifies, as a calibration area, an area where black is to be developed (an area where the color of the light-absorption color development layer 14K is developed) based on the recording position. For example, the processor 31 specifies, as a calibration area, an area having a rectangular shape of a predetermined size and in which black is to be developed.

The processor 31 has a function of performing color calibration by printing a color chart in the calibration area.

Upon setting the calibration area, the processor 31 acquires a height of the thermal medium 10 using the height detection mechanism 36. Upon acquiring the height, the processor 31 sets various parameters (irradiation parameters) for the laser irradiation mechanism 37 based on the medium parameter, the height, etc.

The processor 31 sets a wavelength of the recording laser light as an irradiation parameter for the laser irradiation mechanism 37 based on the photothermal conversion efficiency, etc. included in the medium parameter. For example, the processor 31 sets, as a wavelength of the recording laser light, a wavelength at which the photothermal conversion efficiency exceeds a predetermined threshold value.

The processor 31 sets a focal distance of the recording laser light as an irradiation parameter for the laser irradiation mechanism 37 based on the height of the thermal medium 10, etc. That is, the processor 31 sets a focal distance of the recording laser light so that the recording laser light is focused on the photothermal conversion layer 13 or the light-absorption color development layer 14K.

If the medium parameter includes a distance from the front or back surface of the thermal medium 10 to the photothermal conversion layer 13 or the light-absorption color development layer 14K, the processor 31 may set a focal point of the recording laser light based on the distance. The memory 32 may store in advance a distance from the front or back surface of the thermal medium 10 to the photothermal conversion layer 13 or the light-absorption color development layer 14K.

The processor 31 sets a focal depth of the recording laser light as an irradiation parameter for the laser irradiation mechanism 37 based on the height of the thermal medium 10, etc. For example, the processor 31 calculates a flatness of the thermal medium 10 from the height of each part of the thermal medium 10. Based on the calculated flatness, etc., the processor 31 sets a focal depth of the recording laser light so that the recording laser light is focused on the photothermal conversion layer 13.

The content to be set for the laser irradiation mechanism 37 by the processor 31 is not limited to a specific configuration.

Upon setting the irradiation parameter for the laser irradiation mechanism 37, the processor 31 prints a color chart in the calibration area using the laser irradiation mechanism 37. That is, the processor 31 irradiates, using the laser irradiation mechanism 37, the photothermal conversion layer 13 with the recording laser light.

The processor 31 irradiates the photothermal conversion layer 13 with the recording laser light so that the color development layer to develop a color is heated to a temperature at which a color is developed. For example, if yellow is to be developed, the processor 31 irradiates, using the laser irradiation mechanism 37, the photothermal conversion layer 13 with the recording laser light so that the temperature of the high-temperature thermal Y color development layer 14Y is equal to or higher than the first threshold temperature T1. In this case, the processor 31 controls the irradiation time, intensity, etc., and applies the recording laser light so that the temperature of the medium-temperature thermal M color development layer 14M does not become equal to or higher than the second threshold temperature T2, and the temperature of the low-temperature thermal C color development layer 14C does not become equal to or higher than the third threshold temperature T3.

If magenta is to be developed, the processor 31 irradiates, using the laser irradiation mechanism 37, the photothermal conversion layer 13 with the recording laser light so that the temperature of the medium-temperature thermal M color development layer 14M is equal to or higher than the second threshold temperature T2. In this case, the processor 31 controls the irradiation time, intensity, etc., and applies the recording laser light so that the temperature of the high-temperature thermal Y color development layer 14Y does not become equal to or higher than the first threshold temperature T1, and the temperature of the low-temperature thermal C color development layer 14C does not become equal to or higher than the third threshold temperature T3.

If cyan is to be developed, the processor 31 irradiates, using the laser irradiation mechanism 37, the photothermal conversion layer 13 with the recording laser light so that the temperature of the low-temperature thermal C color development layer 14C is equal to or higher than the third threshold temperature T3. In this case, the processor 31 controls the irradiation time, intensity, etc., and applies the recording laser light so that the temperature of the high-temperature thermal Y color development layer 14Y does not become equal to or higher than the first threshold temperature T1, and the temperature of the medium-temperature thermal M color development layer 14M does not become equal to or higher than the second threshold temperature T2.

The processor 31 prints, using the irradiation position control mechanism 38 to control the irradiation position of the recording laser light, the color chart in the calibration area.

Figure 7:
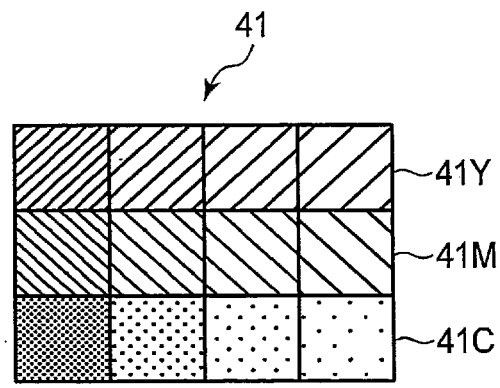
FIG. 7 is a diagram showing an example of a color chart formed by the laser recording device according to the embodiment.

FIG. 7 shows an example of a color chart 41 to be printed by the processor 31. The color chart 41 is an image obtained by printing yellow, magenta, and cyan at a plurality of densities.

As shown in FIG. 7, the color chart 41 includes a pattern 41Y, a pattern 41M, and a pattern 41C.

The pattern 41Y is an image obtained by printing yellow at a plurality of densities. Here, the pattern 41Y is a set of images printed at four densities. In the pattern 41Y, the density decreases in order from the left image.

The pattern 41M is an image obtained by printing magenta at a plurality of densities. Similarly, the pattern 41M is a set of images printed at four densities. In the pattern 41M, the density decreases in order from the left image.

The pattern 41C is an image obtained by printing cyan at a plurality of densities. Similarly, the pattern 41C is a set of images printed at four densities. In the pattern 41C, the density decreases in order from the left image.

Note that the configuration of the color chart 41 is not limited to a specific configuration.

Upon printing the color chart in the calibration area, the processor 31 captures, using the camera 39, an image of the calibration area on which the color chart is printed.

Upon capturing an image of the calibration area, the processor 31 performs calibration based on the captured image. For example, the processor 31 acquires a density of a color chart included in the captured image. If a predetermined color has a density differing from a desired density, the processor 31 corrects the irradiation parameter of the laser irradiation mechanism 37 so that the predetermined color has a desired density. The processor 31 may correct the irradiation parameter based on the temperature inside the laser irradiation mechanism 37.

After correcting the setting of the laser irradiation mechanism 37, the processor 31 may set another calibration area to print a color chart in the calibration area. The processor 31 may capture an image of the calibration area using the camera 39 to perform calibration again.

The processor 31 also has a function of printing a print image on the thermal medium 10.

The processor 31 sets, using the irradiation position control mechanism 38, the irradiation position based on the print image on the thermal medium 10. Upon setting the irradiation position, the processor 31 irradiates the irradiation position with the recording laser light using the laser irradiation mechanism 37. As a result, as described above, the photothermal conversion layer 13 at the irradiated position is heated, and the color development layer group 14 develops a color.

If yellow, magenta, or cyan is to be developed, the processor 31 irradiates the photothermal conversion layer 13 with the recording laser light from the base material 11 side. If black is to be developed, the processor 31 may irradiate the light-absorption color development layer 14K with the recording laser light from the protective functional layer 18 side.

The processor 31 applies the recording laser light in the same manner at each irradiation position based on the print image to print the print image on the thermal medium 10.

Upon completion of printing, the processor 31 discharges the thermal medium 10 to the outside using the conveyance mechanism 33. The processor 31 may put the thermal medium 10 on which the print image is printed into a predetermined container, etc.

Next, an operation example of the laser recording device 30 will be described.

Figure 8:
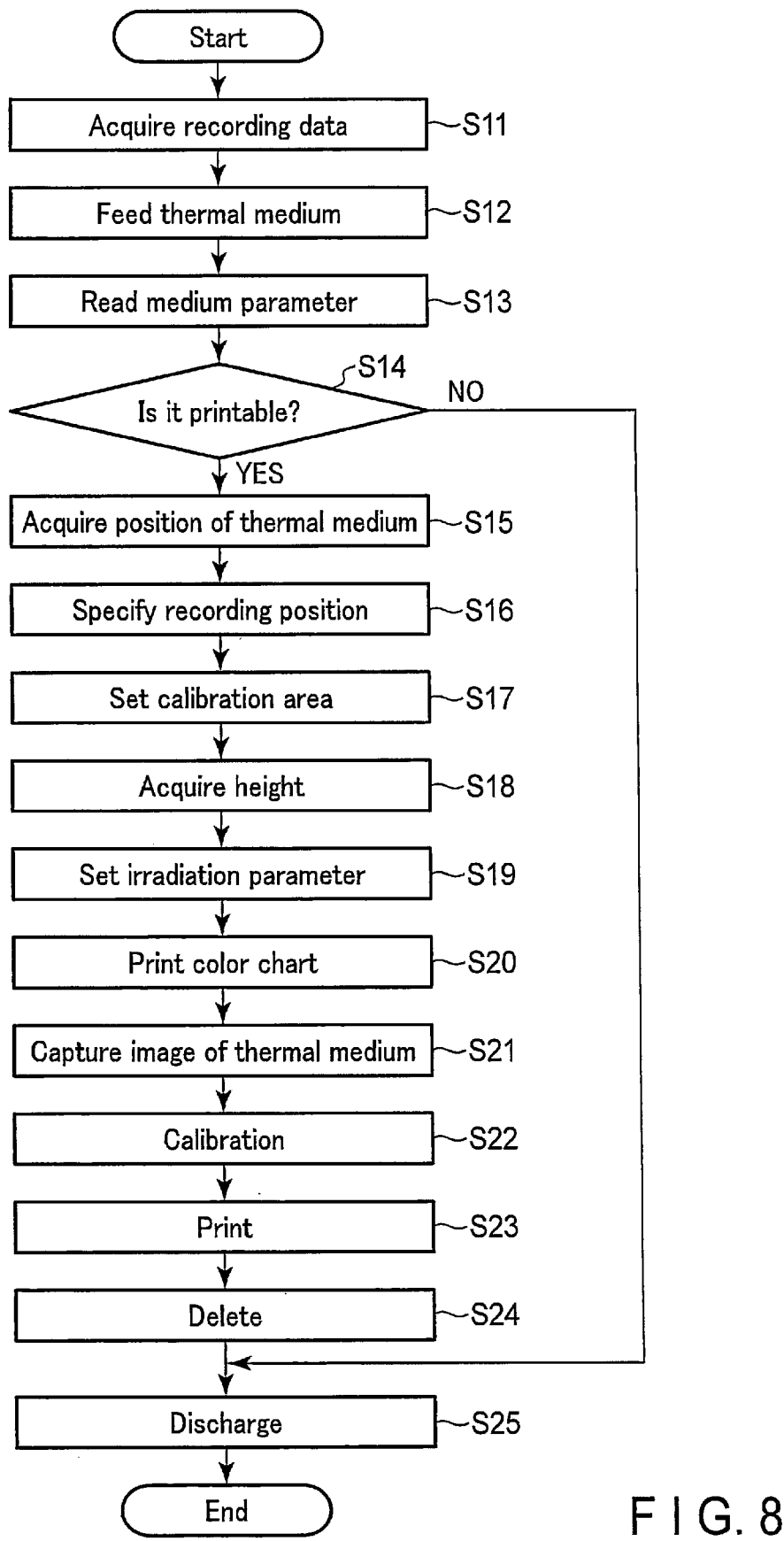
FIG. 8 is a flowchart showing an operation example of the laser recording device according to the embodiment.

FIG. 8 is a flowchart for explaining an operation example of the laser recording device 30.

First, the processor 31 of the laser recording device 30 acquires recording data (S11). Upon acquiring the recording data, the processor 31 feeds the thermal medium 10 using the conveyance mechanism 33 (S12).

Upon feeding the thermal medium 10, the processor 31 acquires a medium parameter from the storage mechanism 20 of the thermal medium 10 using the reading mechanism 34 (S13). Upon acquiring the medium parameter, the processor 31 determines whether an image can be printed on the thermal medium 10 based on the medium parameter (S14).

Upon determining that an image can be printed on the thermal medium 10 (S14, YES), the processor 31 acquires a position of the thermal medium 10 using the position detection mechanism 35 (S15). Upon acquiring the position of the thermal medium 10, the processor 31 specifies a recording position based on the print image based on the recording data, the position of the thermal medium 10, etc. (S16).

Upon specifying the recording position, the processor 31 sets a calibration area based on the recording position (S17). Upon setting the calibration area, the processor 31 acquires a height of the thermal medium 10 using the height detection mechanism 36 (S18).

Upon acquiring the height of the thermal medium 10, the processor 31 sets an irradiation parameter for the laser irradiation mechanism 37 (S19). Upon setting the irradiation parameter for the laser irradiation mechanism 37, the processor 31 prints a color chart in the calibration area (S20).

Upon printing the color chart, the processor 31 captures, using the camera 39, an image including the calibration area (S21). Upon capturing the image, the processor 31 performs calibration based on the captured image, etc. (S22).

Upon performing calibration, the processor 31 prints an image based on the recording data on the thermal medium 10 using the laser irradiation mechanism 37 and the irradiation position control mechanism 38 (S23). Upon printing the image based on the recording data on the thermal medium 10, the processor 31 deletes the recording data (S24).

Upon determining that the image cannot be printed on the thermal medium 10 (S14, NO) or deleting the recording data (S24), the processor 31 discharges the thermal medium 10 (S25).

Upon discharging the thermal medium 10, the processor 31 terminates the operation.

The processor 31 may acquire the recording data upon determining that printing is possible on the thermal medium 10.

The processor 31 may repeat S20 to S22 a plurality of times. In this case, the processor 31 may reset the calibration area to another area.

The reading mechanism 34, the position detection mechanism 35, and the camera 39 may be integrally configured. For example, the reading mechanism 34, the position detection mechanism 35, and the camera 39 may be configured by one camera.

The storage mechanism 20 may be a wireless tag such as radio frequency identification (RFID). In this case, the storage mechanism 20 stores an ID associated with the medium parameter. The storage mechanism 20 transmits the ID to the laser recording device 30. The storage mechanism 20 is formed inside the protective functional layer 18, or the like. The processor 31 acquires the ID from the wireless tag using the reading mechanism 34 that transmits and receives data to and from the wireless tag. The processor 31 acquires a medium parameter corresponding to the ID from the memory 32 or an external device.

Next, a modification of the thermal medium 10 will be described. Here, the thermal medium does not have the light-absorption color development layer 14K.

Figure 9:
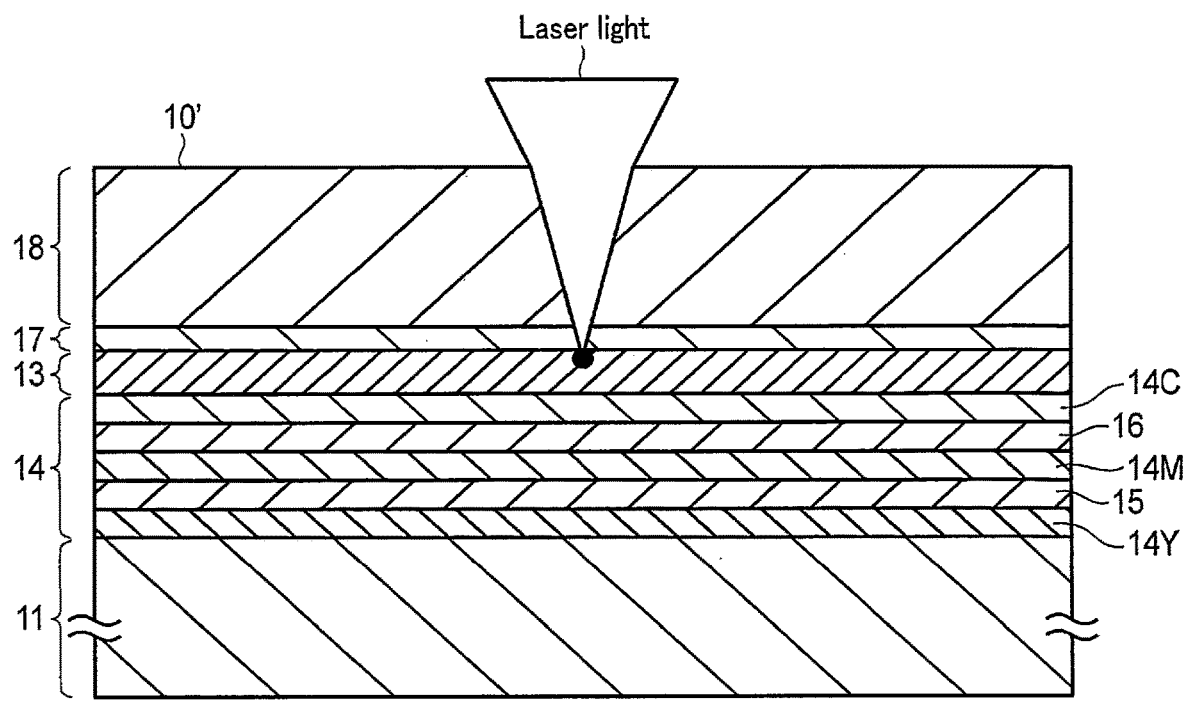
FIG. 9 is a cross-sectional view of another configuration example of the thermal medium according to the embodiment.

FIG. 9 is a cross-sectional view of a configuration example of a thermal medium 10' that does not have the light-absorption color development layer 14K. In FIG. 9, the thermal medium 10' has a structure in which the low-temperature thermal C color development layer 14C, the intermediate layer 15, the medium-temperature thermal M color development layer 14M, the intermediate layer 16, the high-temperature thermal Y color development layer 14Y, the photothermal conversion layer 13, the adhesive layer 17, and the protective functional layer 18 are laminated in order on the base material 11. In this case, the laser irradiation mechanism 37 applies the recording laser light from the protective functional layer 18.

Figure 10:
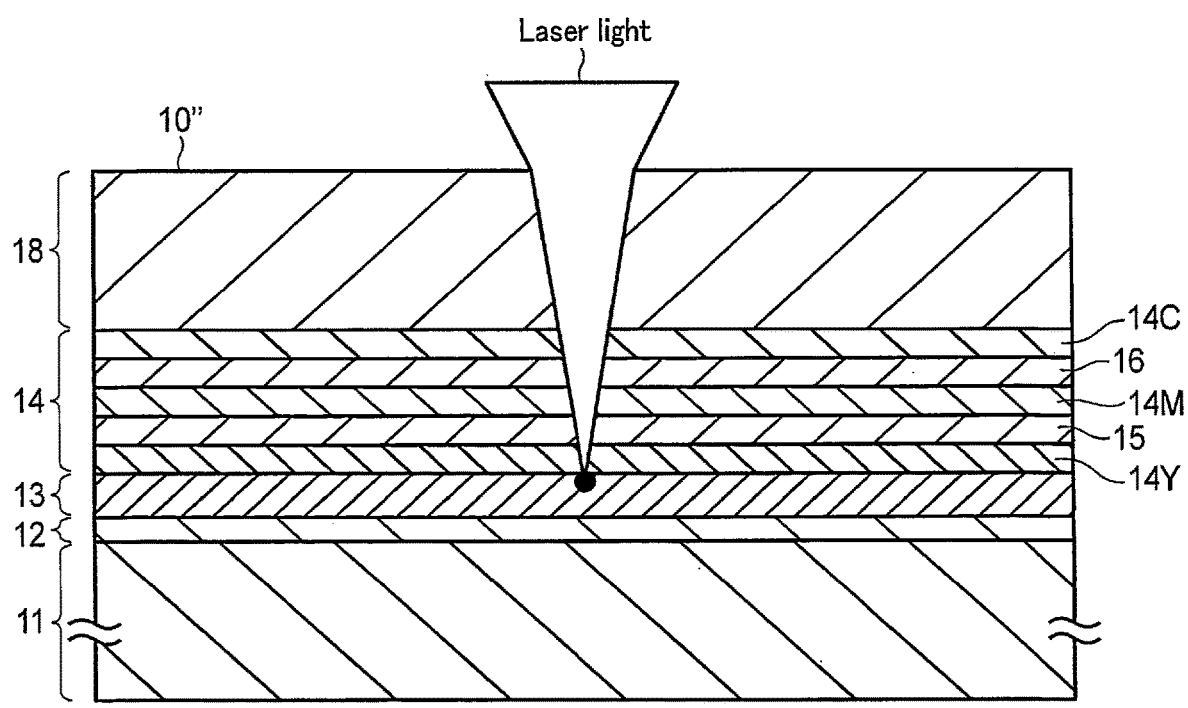
FIG. 10 is a cross-sectional view of still another configuration example of the thermal medium according to the embodiment.

FIG. 10 is a cross-sectional view of another configuration example of a thermal medium 10" that does not have the light-absorption color development layer 14K. In FIG. 10, the thermal medium 10" has a structure in which the adhesive layer 12, the photothermal conversion layer 13, the high-temperature thermal Y color development layer 14Y, the intermediate layer 15, the medium-temperature thermal M color development layer 14M, the intermediate layer 16, the low-temperature thermal C color development layer 14C, and the protective functional layer 18 are laminated in order on the base material 11. In this case, the laser irradiation mechanism 37 irradiates the recording laser light from the protective functional layer 18.

Even in the configuration examples shown in FIGS. 9 and 10, the base material 11 may not be transparent to visible light or near-infrared light.

The recording system configured as described above acquires a medium parameter from a thermal medium. The recording system sets an irradiation parameter related to laser light applied to the thermal medium based on the medium parameter. The recording system irradiates the thermal medium with laser light according to the set irradiation parameter to print an image on the thermal medium.

The recording system can acquire the medium parameter without receiving an input of the medium parameter from a user, etc. Therefore, the recording system can acquire the medium parameter efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A thermal medium, comprising:
a photothermal conversion layer that converts an applied laser beam into heat;

a color development layer that develops a color by the heat converted by the photothermal conversion layer; and a storage mechanism that stores information related to a medium parameter including a photothermal conversion efficiency of the photothermal conversion layer.

2. The thermal medium according to claim 1, wherein the medium parameter includes a photothermal conversion efficiency at a plurality of wavelengths.

3. The thermal medium according to claim 1, wherein the medium parameter includes a distance from a front surface or a back surface of the thermal medium to the photothermal conversion layer.

4. The thermal medium according to claim 1, wherein the storage mechanism comprises a code indicative of the medium parameter.

5. The thermal medium according to claim 1, wherein the storage mechanism comprises an IC chip that stores the medium parameter.

6. The thermal medium according to claim 1, wherein the storage mechanism comprises a wireless tag that stores an ID corresponding to the medium parameter.

7. The thermal medium according to claim 1, wherein the color development layer comprises a first color development layer that develops a first color, a second color development layer that develops a second color, and a third color development layer that develops a third color.

8. The thermal medium according to claim 1, comprising a light-absorption color development layer that develops black.

9. A laser recording device, comprising:
a conveyance mechanism configured to feed a thermal medium, the thermal medium comprising: a photothermal conversion layer that converts an applied laser beam into heat; a color development layer that develops a color by the heat converted by the photothermal conversion layer; and a storage mechanism that stores information related to a medium parameter including a photothermal conversion efficiency of the photothermal conversion layer;

a laser irradiation mechanism configured to irradiate the thermal medium with a laser beam;

a reading mechanism configured to read the medium parameter; and a processor configured to set an irradiation parameter related to laser beam irradiation based on the medium parameter, and irradiate the thermal medium with the laser beam using the laser irradiation mechanism in accordance with the set irradiation parameter.

10. The laser recording device according to claim 9, wherein the irradiation parameter includes a wavelength of the laser beam with which the laser irradiation mechanism irradiates the thermal medium.

11. The laser recording device according to claim 9, wherein the processor is configured to irradiate the thermal medium with a laser beam if the laser irradiation mechanism is capable of irradiating the thermal medium with a laser beam having a wavelength based on the medium parameter.

12. The laser recording device according to claim 9, comprising:
a camera that captures an image of the thermal medium, the processor being configured to:
print a chart on the thermal medium using the laser irradiation mechanism;
capture an image including the chart using the camera; and
correct the irradiation parameter using the image.

13. The laser recording device according to claim 9, wherein the processor is configured to print a print image related to identification on the thermal medium using the laser irradiation mechanism.

* * * * *